United States Patent [19]
Takahashi et al.

[11] 3,790,789
[45] Feb. 5, 1974

[54] CIRCUIT FOR CONTROLLING EXPOSURE

[76] Inventors: Isao Takahashi; Tsutomu Kimura, both of 210 Minami, Ashigara-shi, Kanagawa, Japan

[22] Filed: Sept. 22, 1972

[21] Appl. No.: 291,481

[30] Foreign Application Priority Data
Sept. 22, 1971 Japan.............................. 46/74031

[52] U.S. Cl................ 250/209, 250/214 P, 355/68
[51] Int. Cl...................... G03b 27/74, G03b 27/78
[58] Field of Search............ 250/214 P, 209; 355/68

[56] References Cited
UNITED STATES PATENTS
3,504,603  4/1970  Brzonkala et al. .............. 250/214 P Primary Examiner—James W. Lawrence
Assistant Examiner—T. N. Grigsby
Attorney, Agent, or Firm—Sughrue, Rothwell, Mion, Zinn and Macpeak

[57] ABSTRACT

A circuit for controlling exposure which has a Miller integrator for integrating a photocurrent from a photoelectric converting light acceptor, a circuit for generating a predetermined set level, and a level comparator for generating an exposure finishing signal when the output of the integrator arrives at the predetermined level set by the level generating circuit. Thus, a great deal of electric current can be obtained without using a photoelectric tube or thyratron. A low impedance circuit may be used which is not affected by leaking current or dark current so as not to deteriorate the elements and thereby improve circuit reliability.

2 Claims, 5 Drawing Figures

PATENTED FEB 5 1974          3,790,789
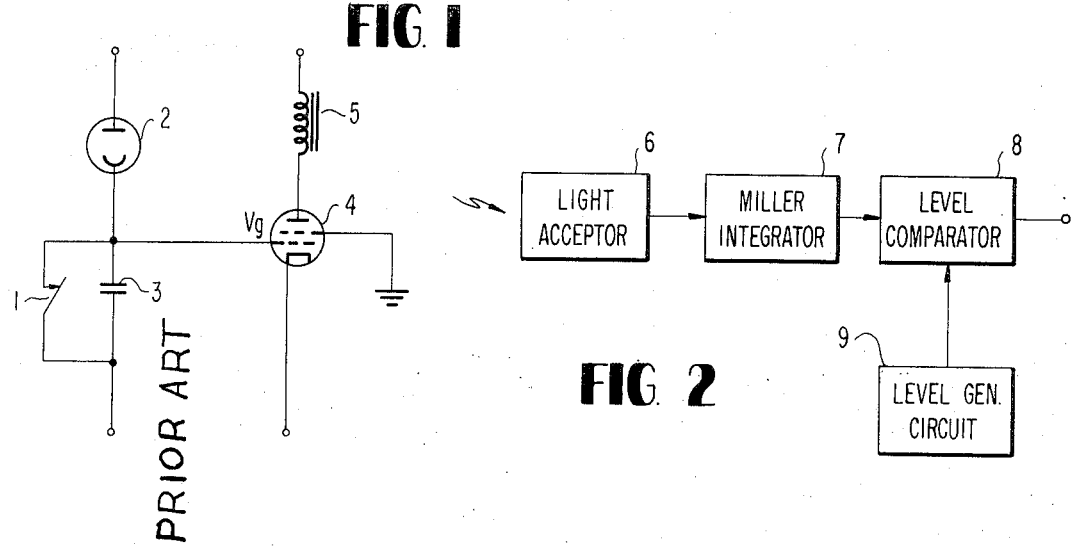
FIG. 1   PRIOR ART
FIG. 2
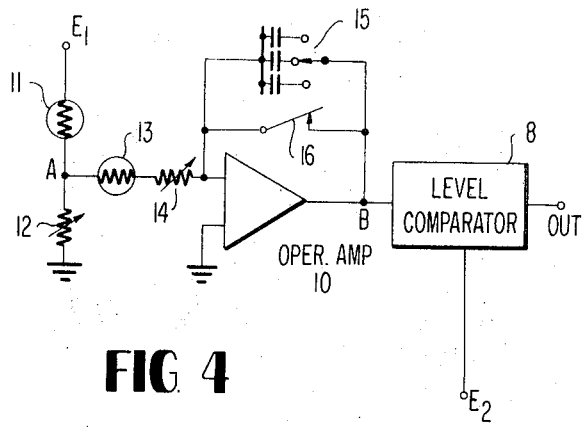
FIG. 3
FIG. 4
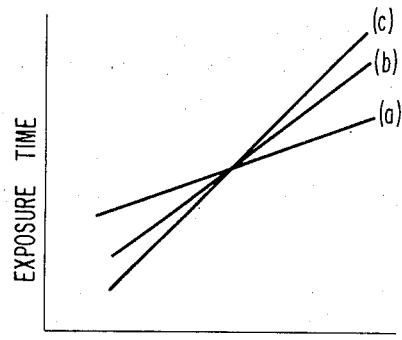
FIG. 5

3,790,789

CIRCUIT FOR CONTROLLING EXPOSURE

BACKGROUND OF THE INVENTION

1. Field of the Invention

This invention relates to an automatic photographic printer, and more particularly to a circuit for controlling the exposure for an automatic photographic printer having a control function for imparting optimum exposure for the characteristic of the photosensitive material used for printing.

2. Description of the Prior Art

The density of a negative of an original picture for photographic printing is different for every negative, and since it is difficult to hold the illumination of a source of light constant during exposure to give a constant amount of light to the photographic sensitive material, the exposure is controlled by a light amount integrating circuit for integrating with respect to time the light to be given to the photographic sensitive material.

In prior art circuitry an integrating circuit is connected in series with a photoelectric tube or photomultiplier to produce a charging current for the integrating circuit. A triggering device such as a thyratron is also connected to the integrating circuit such that it fires when the output of the integrating circuit reaches a predetermined level. In circuits of this type the triggering device must have a high input impedance to allow the charging of the integrating circuit. However, due to the necessity of the high impedances, the circuit will be affected by the humidity of the environment. When the humidity is high the charging current is cancelled by a leakage current, thus causing the improper operation of the device.

SUMMARY OF THE INVENTION

The present invention contemplates the elimination of the aforementioned disadvantages of the conventional exposing circuit of a photographic printer by providing a novel and improved circuit for controlling exposure.

It is, therefore, an object of the present invention to provide a circuit for controlling exposure for an automatic photographic printer which may simply adjust the intensity of printing.

It is another object of the present invention to provide a circuit for controlling exposure for an automatic photographic printer which may provide variable compensation depending upon the sensitivity of the printing paper or intensity of printing.

It is a further object of the present invention to provide a circuit for controlling exposure for an automatic photographic printer which is not affected by leaking current or dark current, thus improving the reliability.

One characteristic feature of the present invention resides in a circuit for controlling exposure which has a Miller integrator for integrating a photocurrent from a photoelectric converting light acceptor, a circuit for generating a predetermined set level, and a level comparator for generating an exposure finishing signal when the output of the integrator arrives at the predetermined level set by the level generating circuit.

BRIEF DESCRIPTION OF THE DRAWINGS

FIG. 1 is a circuit diagram of the conventional exposure control circuit.

FIG. 2 is a block diagram explaining the circuit for controlling exposure in accordance with the present invention.

FIG. 3 is a basic circuit diagram of a Miller integrator.

FIG. 4 is a circuit diagram for explaining generally the present invention.

FIG. 5 is a graph showing the characteristic of the concentration of the negative and printing exposing time.

DESCRIPTION OF THE PREFERRED EMBODIMENT

The basic example of the conventional circuit for controlling the exposure using the light amount integrating circuit will now be described simply with reference to FIG. 1.

A switch 1 is opened with the starting of the exposure. The light penetrating the negative contacts a photoelectric tube or photomultiplier 2 to produce a photocurrent, which charges timing condenser 3. The bias voltage of the integrating condenser 3 is switched from negative to positive by the charging photocurrent so that when the grid voltage $V_g$ of a thyratron 4 reaches zero volts, the thyratron is triggered and an exposure finishing relay 5 is operated to terminate the exposure.

Since the integrating condenser 3 of this type of circuit is directly connected to the photoelectric converting element such as photoelectric tube 2, in order to obtain an output from the integrating circuit, it must be connected to a high impedance element such as the grid of the thyratron 4, or its impedance must be converted. If the connection has a high impedance it is affected by the humidity of the environment, and when the humidity is high such as in a dark room, the charging photocurrent is cancelled by the leaked current of the circuit elements such as switch 1. Thus, even if proper time has lapsed, the exposure does not finish. Further, such a conventional circuit must provide a separate slope circuit in order to compensate for the reciprocity law of the photosensitive material.

The present invention has a low impedance circuit and by utilizing a large photocurrent to the control of the exposure, so as to vary the integrating time constant of the photocurrent integrator in response to the density of the negative to be printed to thus positively and simply provide a slope circuit for improving the exposing time characteristics with respect to the density of the negative.

As shown by block diagram in FIG. 2, the output of the light acceptor 6 is applied to the input of the Miller integrator 7. The output terminal of the Miller integrator 7 is connected to a level comparator 8 so as to generate the exposure finishing signal from the level comparator when the output of the Miller integrator 7 reaches the predetermined level set in the level generating circuit 9.

The Miller integrator, which is known per se as a component element, is shown in FIG. 3 in the circuit of the present invention. The circuit starts to integrate when the start switch 16 is opened. The time constant of the integrating potential of the time 0 to T is determined by a condenser C and a resistor R. The relationship between the input voltage Vi and the output voltage Vc of the mirror integrator is $$Vc = -\frac{1}{RC}\int_0^T Vidt \qquad (1)$$

FIG. 4 shows one example of the embodiment of the present invention. The circuit comprises an operational amplifier 10, photoconductive elements 11 and 13, variable resistors 12 and 14, condenser 15 and start switch 16. The output of the operational amplifier is applied to the level comparator 8.

The operation of the circuit of the present invention will now be described with reference to the example shown in FIG. 4. The following discussion is based on the assumption that the photoconductive element 13 has a certin value for one negative. Of course, this value will vary when a different negative is inserted.

Since the condenser 15 is short-circuited by the start switch 16 before the starting of exposure, the potential $E_B$ at the point B is held at 0. If the switch 16 is opened at the same time of the starting of the exposure, the potential $E_A$ at the point A is integrated so that the potential $E_B$ at the point B is gradually increased. The photoconductive element 11 detects the density of the negative and the resistance R11 is determined by each negative and remains constant for a particular negative unless the source of light for printing is varied during exposure. Therefore, the potential $E_A$ at the point A is constant during exposure for each negative. If the resistance value R13 of the photoconductive element 13 is made constant regardless of the density of the negative in such state, then, if a fixed resistor is put instead of the photoconductive element 13, the potential $E_B$ at the point B after $t$ hours is expressed as follows from the formula (1):

$$E_B = -(E_A/K) t \qquad (2)$$

In operation, both resistance R11 and R13 vary in accordance with the density of the negative. A variation in resistance R11 changes the potential at point A, whereas a variation in resistance R13 changes the time constant of the Miller integration.

Here, when the set predetermined level applied to the level comparator 8 is represented by E2, and when the potential $E_B$ of the formula (2) reaches E2, it generates the exposure finishing signal. Therefore, the exposing time T is obtained by the following formula:

$$T = -(E_2/E_A) K \qquad (3)$$

In the above formula, K is a factor which does not vary according to the density of the negative being processed.

As to the relation of the density D of the negative to the exposing time T, when an overexposed negative is printed, since the light penetrating the negative is reduced, the incident light on the photoconductive element 11 becomes low, and accordingly the resistance value R11 becomes large. Therefore, the potential $E_A$ at the point A is lowered, while the exposing time T is extended. In case of under exposure, for the negative, the above operation is entirely opposite, and the potential $E_A$ at the point A is increased, but the exposing time T becomes short. This state is represented by the line (a) in the graph shown in FIG. 5. The gradient of this characteristic curve (a) depends upon the characteristic of the intensity of illumination versus resistance of the photoconductive element 11. Since the constant of the integration is constant only if a preamplifier is provided between the light acceptor (photoelectric converting element such as photoconductive element, etc.) and the Miller integrator, varying gain only moves the characteristic of the density to the exposing time up and down in parallel, but the slope does not change.

In the above operation as described, the resistance value of the photoconductive element 13 was assumed to be constant. If, however, the photoconductive element 13 is placed at the position to change in response to the density of the negative similar to the element 11, if the resistance value of the variable resistor 14 is represented by R14, the capacitance of the condenser 15 is represnted by C, the formula (2) is expressed as follows:

$$E_B = E_A t /(R43 + R14)C \qquad (2)'$$

Therefore, the formula (3) is expressed as follows:

$$T = -(E^2/E_A)(R13 + R14)C \qquad (3)'$$

In this case, when the negative is overexposed, the variation of the potential $E_A$ at the point A is the same as that when the photoconductive element 13 is replaced with the fixed resistor, but if the photoconductive element 13 is variable since the penetrated light of the overexposed negative is reduced, the resistance value R13 of the photoconductive element 13 becomes large, and accordingly the integrating time constant of the integrator becomes large. Thus, the time required to complete exposure is lengthened. Here, the larger the value of the resistance R13 in comparison with the resistance R14 of the variable resistor 14, the greater the effect on the extension of the exposure finishing time, as is shown by the characteristic curve (b) or (c) in the graph shown in FIG. 5. If the resistance R14 is sufficiently larger than the resistance R13, the variation of the resistance R13 of the photoconductive element 13 can be ignored, and accordingly it approaches the characteristic curve (a) in the graph shown in FIG. 5. Therefore, the slope can be simply changed by providing the value of the variable resistor 14 so as to adjust the intensity of printing.

Further, if the respective values of the applied voltage E1 of the photoconductive element 11, the capacity of the condenser 15 of the Miller integrator, and the set predetermined level E2 of the level comparator are varied, the compensation keys for the compensation based on the sensitivity of the printing paper to be printed or the compensation for the degree of the intensity of printing are provided independently so as to variably compensate the printing exposure.

The compensation keys represent means for varying the exposure conditions according to the sensitivity of the printing paper, etc. (manual adjustment), and do not vary conditions in response to change in the density of the negative of the original picture. Depending upon the factor compensated for, the compensation keys could correspond to a variable resistor for varying the level E2 (not shown), a variable resistor such as R11 or a variable condenser such as C.

Since the circuit of the present invention has the feature that it does not use a photoelectric tube or thyratron, a low impedance circuit may be used and a great deal of current may be obtained. Accordingly, the circuit is not affected by the leaked current or dark current, and deterioration of the elements is not present, thus improving reliability.

While the invention has been particularly shown and described with reference to the preferred embodiment thereof, it will be understood by those skilled in the art that various changes in form and details may be made therein without departing from the spirit and scope of the invention.

We claim:

1. A circuit for controlling the exposure of a photographic print through a negative comprising:
   a. first and second photoelectric converting light acceptor means for generating first and second photocurrents, respectively, in accordance with the light passing through said negative;
   b. first and second resistor means respectively connected in series with said first and second photoelectric converting light acceptor means, the series connection of said second resistor means and said second photoelectric converting light acceptor means being connected to the junction of said first resistor means and said first photoelectric converting light acceptor means;
   c. Miller integrator means including an operational amplifier, capacitor means connected between the input and output of said operational amplifier, and switch means in parallel with said capacitor means whereby upon the opening of said switch means said capacitor is charged, said series connection of said second resistor means and said second photoelectric converting light acceptor means being connected as the input resistance of said operational amplifier thereby determining the integrating time constant of said Miller integrator;
   d. level generator means for generating a signal having a predetermined level; and
   e. level comparator means for comparing the output of said Miller integrator means to said predetermined level and for generating an exposure finishing signal when the output of said Miller integrator reaches said predetermined level.

2. The circuit as set forth in claim 1 wherein said first and second resistor means are variable resistances.

* * * * *

UNITED STATES PATENT OFFICE
CERTIFICATE OF CORRECTION

Patent No. 3,790,789　　　　　　　　　Dated February 5, 1974

Inventor(s) Isao TAKAHASHI et al

It is certified that error appears in the above-identified patent and that said Letters Patent are hereby corrected as shown below:

In the Heading:

Insert Assignee's name and address as follows:

-- Fuji Photo Film Co., Ltd., Ashigara-shi, Kanagawa, Japan --

Signed and sealed this 13th day of August 1974.

(SEAL)
Attest:

McCOY M. GIBSON, JR.　　　　　　　C. MARSHALL DANN
Attesting Officer　　　　　　　　　Commissioner of Patents